United States Patent [19]
Arnold

[11] 3,967,658
[45] July 6, 1976

[54] APPARATUS AND METHOD FOR USE IN WINDING COILS

[75] Inventor: Richard B. Arnold, Fort Wayne, Ind.

[73] Assignee: General Electric Company, Fort Wayne, Ind.

[22] Filed: Mar. 5, 1975

[21] Appl. No.: 555,370

[52] U.S. Cl. .................................. 140/92.1; 226/97
[51] Int. Cl.$^2$ ............................................. B21F 3/00
[58] Field of Search ............ 140/92.1, 92.2; 226/97; 254/134.4

[56]  References Cited
  UNITED STATES PATENTS

| | | | |
|---|---|---|---|
| 3,314,619 | 4/1967 | Kerstetter | 140/92.2 |
| 3,579,791 | 5/1971 | Arnold | 140/92.1 |
| 3,689,031 | 9/1972 | Ruddick et al. | 254/134.4 |
| 3,834,600 | 9/1974 | Benchemoul | 226/97 |

OTHER PUBLICATIONS
B441,024, Jan. 1975, Kieffer, 140/92.1.

*Primary Examiner*—Lowell A. Larson
*Attorney, Agent, or Firm*—Ralph E. Krisher, Jr.

[57] ABSTRACT

One disclosed method includes positioning an end of a wire strand adjacent to a propelling mechanism and near a contorted guide tube entry and then propelling the lead end of the wire through the contorted tube. An air passage block and air supply means may be used to establish a venturi type effect at the end of the tube. With the wire end positioned adjacent the tube entry, with or without wadding, air injected into the air passage propels the wire. Also disclosed is a method of damping oscillations of wire segments that are being dispensed in a winding plane and the disclosed apparatus includes an oscillation damping plate mounted substantially along winding plane.

Another method includes moving a wire clamp adjacent to, and then into the plane; clamping a wire segment; concurrently moving the clamp and a developed coil predetermined amounts, and pulling an extra segment of wire from a wire supply. This is followed by holding the clamp closely adjacent to the winding plane until initial turns for a next coil have been generated. The apparatus includes a clamp assembly characterized by at least six, and preferably eight, distinct movements (or increments of travel) which may be initiated independently, or selectively in combination with each other. In one illustrated form, a clamp jaw moves in forward and reverse modes to open or closed positions; is carried on a first member movable into and out of the winding plane; and the first member is carried by a swing mechanism that is movable in forward and reverse modes or directions in at least two different substantially mutually perpendicular planes.

26 Claims, 6 Drawing Figures

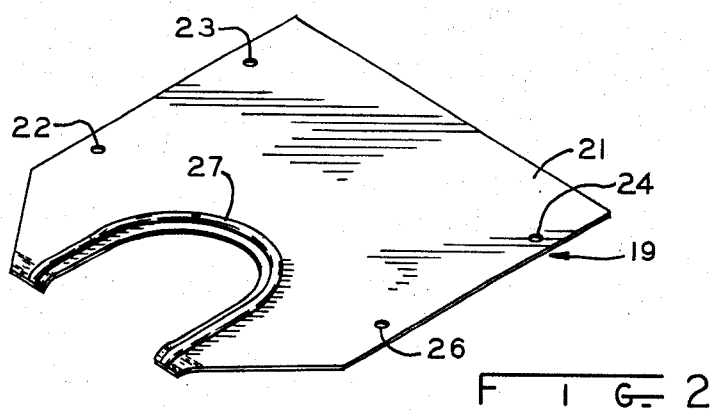
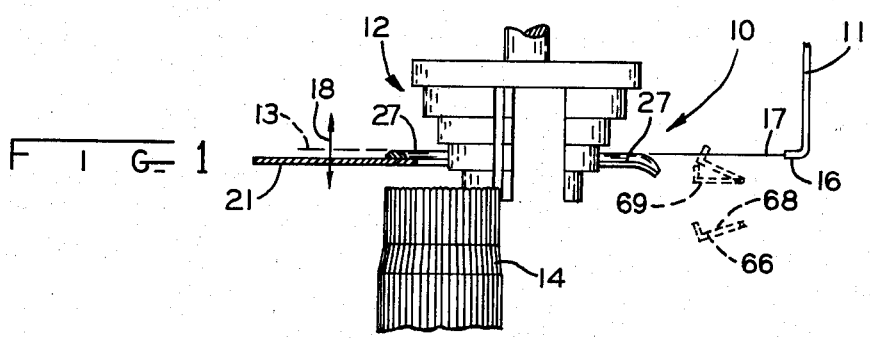
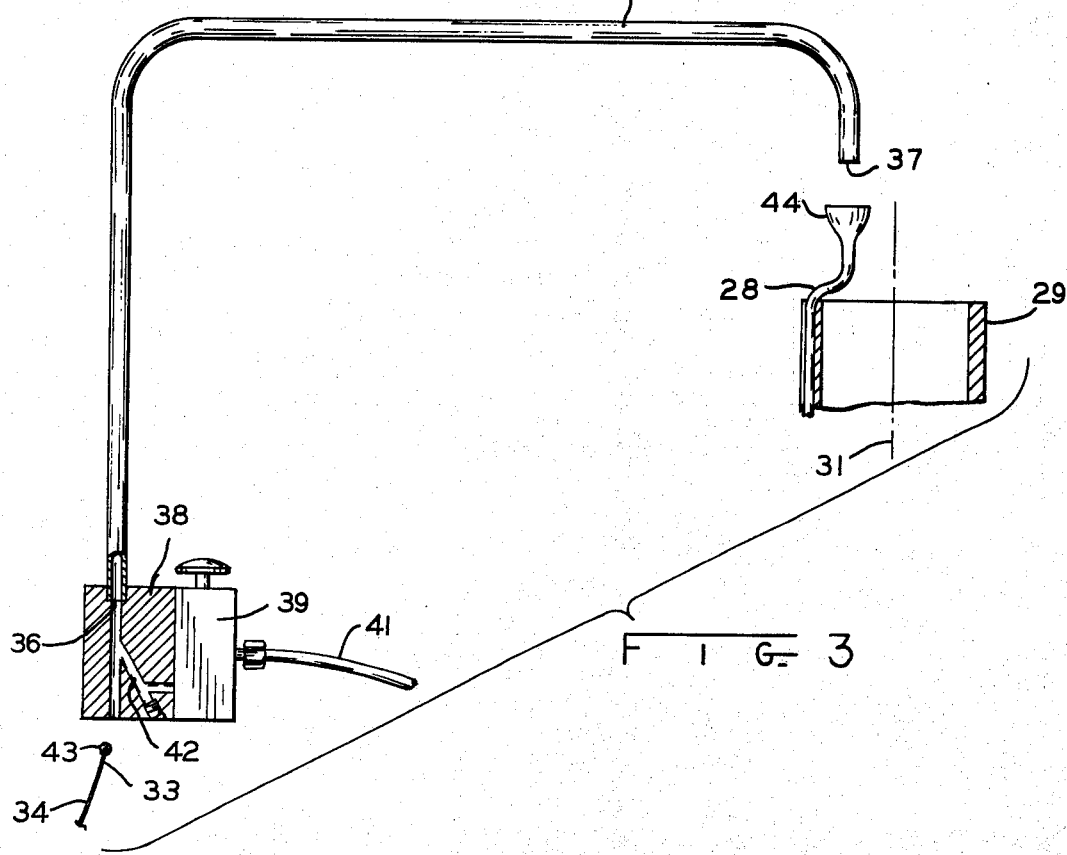

APPARATUS AND METHOD FOR USE IN WINDING COILS

CROSS-REFERENCE TO RELATED APPLICATIONS

The subject matter of the present application is related to the subject matter of application Ser. No. 555,369, which is assigned to the same assignee as the present application, was filed the same day as the present application in the names of R. B. Arnold and L. W. Straley, and is titled APPARATUS AND METHOD FOR USE IN DEVELOPING WOUND COILS. That application's disclosure is incorporated herein by reference.

BACKGROUND OF THE INVENTION

The present invention relates generally to apparatus and methods for use when developing wound coils and, more particularly, to apparatus and methods for handling predetermined segments of magnet wire used for developing coils for dynamoelectric machines such as electric motors.

During one process for winding coils for dynamoelectric machines (e.g., electric motors) magnet wire is fed from a supply (e.g., a reel) along a predetermined path to a wire dispenser which is utilized during generation of winding turns for one or more coils in two or more coil groups which, subsequently, are disposed in slots of a magnetic core.

Periodically, a given wire supply becomes exhausted and the winding process is interrupted while the end of wire from a new or auxiliary supply is fed along the predetermined path before the winding process may be resumed. It will be appreciated that when equipment such as that shown for example in Pavesi U.S. Pat. No. 3,557,432, Hill et al U.S. Pat. No. 3,635,261, or Smith et al U.S. Pat. No. 3,742,596 (these patents being cited and incorporated herein for background purposes) is utilized, substantial amounts of capital will have been invested. In order to obtain a satisfactory return on such investment, it is extremely important that the output of such machines be maximized; and a corollary to this is that the down time for such machines should be minimized. Any excess time that machine utilization is interrupted to resupply wire is down time that should be avoided, if at all possible.

The predetermined path for wire in a coil winding machine usually is relatively long and complex (i.e. contorted) and it may take ten minutes or more to thread the end of a new wire supply through a complex piece of winding equipment. Usually, more complex winding equipment represents a greater investment. Unfortunately, it usually is this kind of equipment that requires a more complex wire path and therefore requires greater amounts of down time whenever a new supply of wire is fed into the machine. While relatively heavy wire is usually easier to supply through a series of wire tubes and guides, fine wire is usually so flexible that when attempts are made to push the fine wire through a contorted guide tube arrangement, the wire jams therein.

Thus, it will be understood that it would be desirable to provide new and improved methods and apparatus whereby magnet wire, and particularly magnet wire of relatively small diameter, may be quickly and easily threaded along a contorted guide tube arrangement to a wire dispensing mechanism.

One type of coil winding operation has become known as "wind and shed" or "shedder" winding, and may be carried out, for example, with equipment of the type illustrated in the above referenced related application or as illustrated for example in Cutler et al U.S. Pat. No. 3,522,650, Arnold U.S. Pat. No. 3,579,791, or Smith et al U.S. Pat. No. 3,742,596. This type of operation often is accomplished by holding a coil form assembly in a winding plane while turns of a first size are developed thereabout. Then, while turns continue to be generated, at least part of the form assembly is jumped axially relative to the winding plane and to a winding turn receiving mechanism. Alternatively, the receiving mechanism and coil forms may rotate; or the wire dispenser and receiving mechanism may be jumped relative to the coil form assembly. When any of the just mentioned approaches are followed, however, a plurality of winding turns will be generated in substantially one given plane. It has now been determined, and particularly for higher winding speeds (e.g. speeds at 2000 r.p.m. and higher), that wire being wound in a fixed winding plane about a coil form assembly may begin to oscillate and vibrate. One result of excessive oscillation is that the wire turns will not shed as smoothly and uniformly as might be desired. Accordingly, it would be desirable, and it is one of the objects of the present invention, to provide new and improved apparatus and methods whereby problems associated with excessive wire vibrations or oscillations in a winding plane may be overcome.

When at least two coil groups ("coil group" also being referred to as "poles" in published literature) are formed in a turn receiving mechanism prior to transfer to a magnetic core structure, a more common approach is to develop a first coil group in the mechanism or receiver, index the receiver, and then wind a second plurality of turns so that a second pole is established in the receiver. It will be understood that the winding direction (e.g., flyer rotation) may be reversed from one pole to the next. Moreover, it will be understood that the receiver may be indexed in either a clockwise or counterclockwise direction about its longitudinal center. In any of these cases, it would be desirable to provide a mechanism and method whereby a segment of an interpole lead wire is grasped as one pole is being indexed in the receiver, an extra segment of wire is pulled from the wire dispenser, and the grasped segment is released after at least some turns for a subsequent pole have been generated. The assignee of the present application has used in its regular commercial production, at least since January, 1973, and in conjunction at least with equipment of the type illustrated in the above referenced U.S. Pat. No. 3,579,791, a mechanism which would clasp a wire segment after a first pole had been developed and release such segment after at least some turns of a second pole had been developed. The device that has been so used, and thus constitutes prior art insofar as the present application is concerned, included a first structure that was movably mounted to a base. The first structure was mounted for sliding movement along a horizontally disposed slide, and a second end of the first structure was connected to the piston of an air cylinder which in turn was fastened to the base. A first end of the first structure pivotally mounted a clasping member which was mounted for rotation, about the pivot, relative to the first structure. A second air cylinder was mounted to the first structure, and the piston of the second air cylinder was connected to the clasping member to cause rotation of a portion thereof through an arcuate path.

Devices of the type just described have been found to be limited in actual practice. Accordingly, it would be desirable to provide new and improved devices and methods for handling interpole wire segments so that an extra or additional length of wire may be pulled from a wire supply while a winding turn receiver is indexed so that an interpole wire segment of adaquate length may be provided.

Accordingly, it is a general object of the present invention to provide new and improved methods and apparatus for handling segments of wire that interconnect coil groups (or poles) that are disposed in a winding turn receiver.

It is another general object of the present invention to provide new and improved methods and apparatus that include provisions for feeding a magnet wire end through a contorted guide tube arrangement.

It is yet another general object of the present invention to provide new and improved methods and apparatus for controlling oscillations of wire segments across a winding plane while winding turns are being generated along such plane.

SUMMARY OF THE INVENTION

In carrying out the above and other objects of the present invention in one preferred form thereof, I have provided a method that includes initially positioning the end of a wire strand adjacent to a propelling mechanism and near to the beginning of a contorted guide tube. Thereafter, I propel the lead end of the wire segment through the tube, including the contorted portions thereof. Apparatus illustrated herein that may embody the invention in another form, and be utilized to carry out the just described steps, includes an air passage block and air supply means which can establish a venturi type of affect on the lead end of the wire. Then, when the wire end is positioned adjacent thereto (with or without a piece of wadding or packing), injection of air into the air passage block causes the wire to travel along the contorted guide tube.

In accordance with another aspect of the invention, I provide a new and improved method of damping oscillations of wire segments that are being dispensed in a winding plane. Apparatus, which may be used to carry out the invention just mentioned, includes an oscillation damping plate which is mounted to a winding machine so as to lie substantially along the winding plane wherein a plurality of winding turns are to be generated.

In accordance with yet another aspect of the present invention, there is provided a method that includes moving a wire segment gripper or clamp adjacent to a winding plane, and then into the winding plane; clamping a wire segment along the last turn of a coil group; and concurrently moving the clamped wire segment and the developed pole predetermined amounts and pulling an extra segment of wire from a wire supply. Thereafter, I continue to hold the clamped wire segment closely adjacent to the winding plane until some of the initial turns for a next succeeding coil group have been generated. Then I release the clamped wire segment, and return the wire clamp to a ready position in preparation for a next wire segment pulling sequence. Apparatus illustrated herein that embodies the invention in yet another form, and which may be used to carry out the steps just summarized, includes a clamp part that includes a wire clamp which is characterized by at least six, and preferably eight, distinct movements (or increments of travel) which may be initiated independently, or selectively in combination with each other.

In one illustrated form of apparatus, a clamping jaw is movable to an open or closed position; the opening and closing action comprising two distinct movements. The clamping jaw is carried on a first member which may be moved into and out of a winding plane so that the clamp jaw may intercept a wire segment being generated from a wire dispenser. The first member in turn is carried by a swing mechanism that is movable both toward and away from the winding plane as well as toward and away from a developed coil group.

The subject matter which I regard as my invention is particularly pointed out and distinctly claimed in the concluding portion of this specification. The invention itself, however, both as to its organization and mode of operation, together with further objects and advantages thereof may be best understood by reference to the following description taken in connection with the accompanying drawings.

BRIEF DESCRIPTION OF THE DRAWINGS

FIG. 1 schematically illustrates winding apparatus that may embody various aspects of the present invention, in preferred forms thereof, and which may be used while practicing the present invention;

FIG. 2 is a perspective view of a wire oscillation damping plate, parts of which are also represented in FIG. 1;

FIG. 3 is a schematic representation of a contorted wire guide tube that may be interconnected with the apparatus of FIG. 1 to supply wire to a winding mechanism;

DESCRIPTION OF THE PREFERRED EMBODIMENTS

Figure 4:
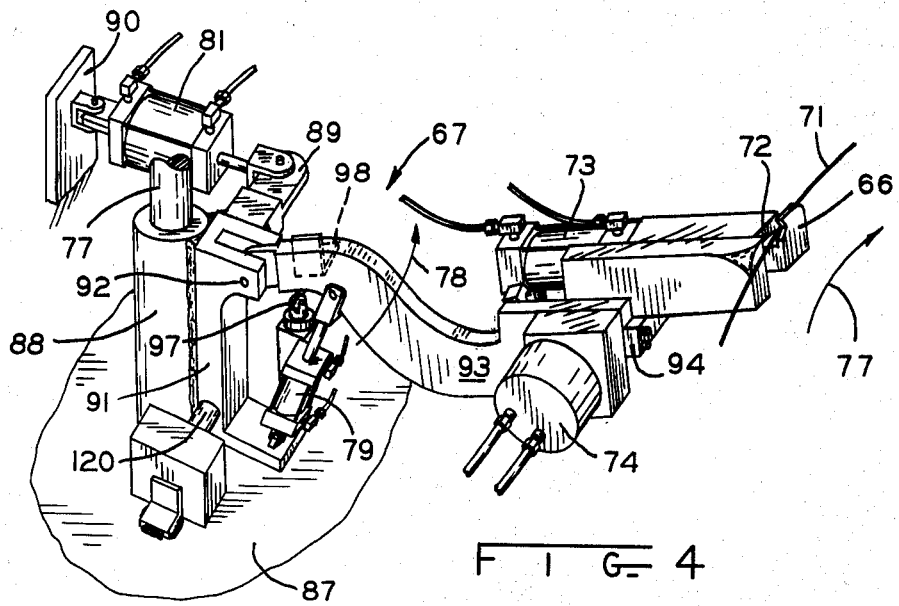
FIG. 4 is a perspective view of a wire segment controlling device which embodies other aspects of the invention and which may be utilized to practice the invention in another form thereof.

Before commencing on a detailed description of the winding apparatus illustrated in FIG. 1, it is noted that the apparatus and structures illustrated and specifically described herein are presented only for the purposes of enabling persons skilled in the art to utilize the present invention. Moreover, structural features that embody different aspects of the invention may be used with coil winding equipment other than the particular types illustrated herein.

In FIG. 1, the winding mechanism of a wind and shed type winder 10 has been illustrated. More specifically, the winder 10 includes means for establishing the size of different turns in a coil group and wire dispensing means. The wire dispensing means has been shown as a rotating flyer 11; and also shown is a coil form assembly 12 that has at least parts thereof movable axially through a winding plane 13 so that at least part of the coil form assembly may be moved axially relative to a winding turn receiver. The winding turn receiver, hereinafter referred to as coil receiver 14, may be used to subsequently transfer two or more coils to a known piece of coil injection equipment. Alternatively, the tools that form the coil receiver 14 may be designed (as shown) so that a magnetic core may be positioned over the free end thereof. As will be understood by persons skilled in the art, the coils disposed therein may then be axially injected directly into slots of a magnetic core. Apparatus of this type is shown for example in the above referenced Smith et al U.S. Pat. No. 3,742,596, the entire disclosure of which is specifically incorporated herein by reference.

As the flyer arm 16 rotates in the winding plane 13 to generate turns of wire about the coil form assembly 12, the moving wire segment 17, extending from the flyer arm to the coil form assembly, tends to oscillate and vibrate in an axial direction (i.e., in the directions indicated by arrow 18). It has been found that improved coil turn formation may be accomplished by damping such oscillations, and one form of structure that may be provided to damp such oscillations has been provided in FIG. 1 in the form of a wire oscillation damping plate 19.

The damping plate 19 is shown in more detail in FIG. 2 and, as will there be seen, includes a supporting member 21 which may be fastened to the frame of the apparatus 10 and positioned as desired relative to the winding plane. With continued reference to FIG. 2, the wire oscillation damping plate is provided with a number of mounting holes 22, 23, 24, 26 which will receive cap screws that in turn are threaded into part of the winding machine frame. The supporting member 21 is to be spaced from the winding plane, but an interference ledge 27, horseshoe in shape, is disposed immediately adjacent to the winding plane so that wire segments are constrained from oscillating axially therebeyond during a winding cycle.

With reference once again to FIG. 1, it will be noted that a wire segment 17 is continuously dispensed from the flyer so that wire turns may be wound about the coil form assembly 12. It will be understood that the flyer includes a guide tube (or guide rollers) along which the continuous wire segment is pulled. Wire moving to the flyer is supported, as it moves along apparatus 10, by one or more guide tubes. More specifically, and now referring to FIG. 3, one guide tube may be tube 28 which is carried by, and constrained to rotate with, a winding spindle 29 about an axis 31. The spindle 29, in turn, is interconnected with the flyer of FIG. 1. Wire is supplied to rotating tube 28 along yet another contorted guide tube arrangement supported on the winding machine frame and which has been illustrated as a tube 32 having a number of turns or bends therein. Although the tube 32 has been illustrated as a one piece tube, it will be understood that it actually may be made up of a number of different tube sections.

When wire from a given spool of wire has been exhausted, it is necessary to thread the end of a length of wire from a new or auxiliary wire supply. Heretofore it has been necessary to push the wire through the stationary tube 32 until it exited from the end thereof. Thereafter, the wire has been fed down through the rotating tube 28 to and along the flyer arm.

It will be understood that the prior approach, in addition to being tedious and time consuming, can be extremely difficult to achieve in practice, and particularly so when smaller sizes of wire (for example 0.008 to 0.020 of an inch, or 0.2032 – 0.5080 mm diameter) are being handled. One method whereby the wire feeding problem may be overcome includes initially pushing the lead end 33 of a wire 34 from a new supply adjacent to the entry 36 of the guide tube 32. Thereafter, I project the lead end of the wire all along the tube 32 to the exit end 37 thereof. In a more preferred form of the invention, I would continue projecting the wire from the exit end 37 into tube 28 and at least into proximity with the flyer arm.

One device for carrying out the just described method includes an air block 38 to which is mounted a hand operated, spring return air valve 39. A hose 41 connects valve 39 to a supply of shop air. I have found that air supplied at about 6.1 atmospheres of pressure (about 90 psi) is sufficient to propel the lead end 33 of a wire segment 34 all along the guide tube structure. While the lead end 33 of wire 34 is positioned near tube entry 36, the valve 39 is operated so that air is supplied along an air passage 42, to an intersecting passage, and against the lead end of the wire and along the interior of the guide tubes. The air then propels and projects the free end 33 of the wire to a remote section of the winding apparatus. In some cases, and particularly in those cases involving wire of the smallest diameter referred to hereinabove, it is desirable to bend an end of the wire over a small piece of paper or cloth so that an enlarged end or wad 43 is provided. The wad, however, is made small enough to pass through all of the passages of the guide tubes. The upper end 44 of tube 28 must be free to rotate under end 37 of tube 32, but the space therebetween may be made small enough that a wire end will move into tube 28 without difficulty, and particularly when an additional venturi relationship is established by making the end 44 of tube 28 funnel shaped as illustrated in FIG. 3.

Figure 5:
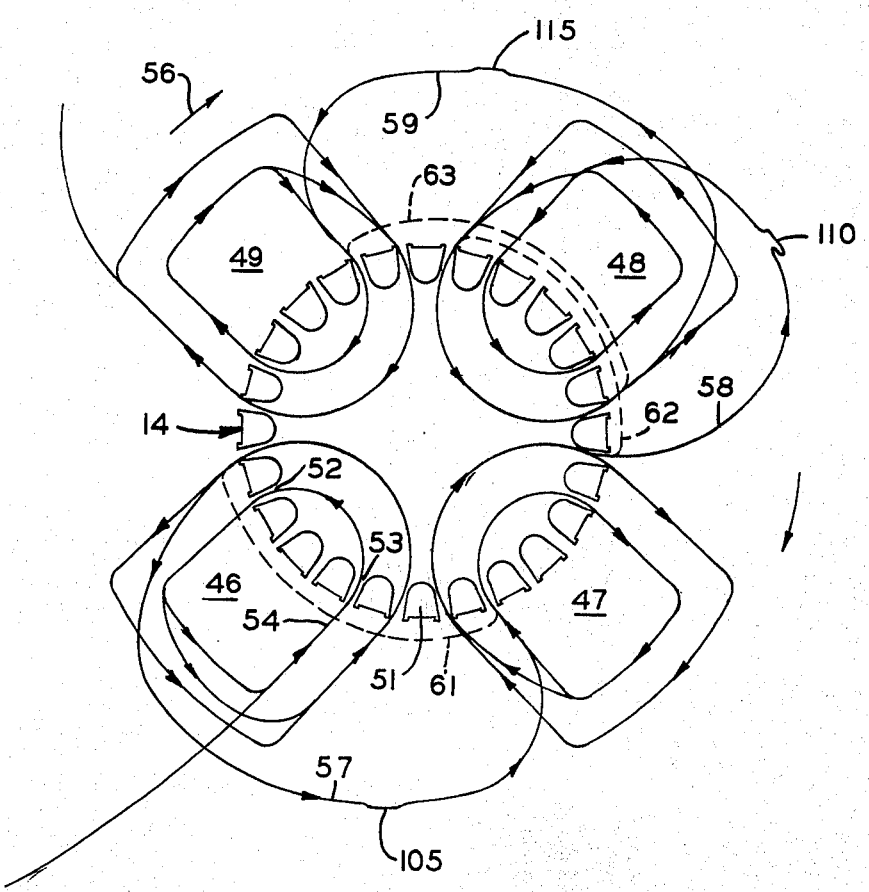
FIG. 5 is a plan view of the coil receiver shown in FIG. 1, with coils disposed therein.

With reference to FIG. 5, it will be understood that four winding poles 46, 47, 48, 49 are shown in the coil receiver 14 which is comprised of twenty-four gap defining fingers 51. During operation of the apparatus of FIG. 1, the coil receivier 14 will be positioned under the coil form assembly so that the first coil group 46 is received therein, with gaps 52 and 53 aligned to receive a number of turns for coil 54 from the first coil winding stage of the coil form assembly. This will take place at station A in FIG. 5. Then, after the last coil for pole 46 is received in the coil receiver 14; the coil receiver is indexed in the direction of arrow 56 so that the coil group 47 may be developed at station A. Subsequently, coil receiver 14 is again indexed and yet another coil group 48 is disposed therein. This sequence of operations continues until an entire winding having the desired number of poles of coil groups has been developed in the coil receiver.

It will be understood that the coil groups illustrated in FIG. 5 are each interconnected by an interpole winding segment which extends from the outermost coil of one coil group to the innermost coil of the next coil group. Moreover, it should be understood that each coil may in fact include more than two coils per coil group and that when this is the case (particularly with the case of two pole windings, each of which may include four or more coils), the distance that must be traversed by an intercoil winding segment between coil groups may be extremely large. In order to avoid wire breakage of the interpole segments during insertion into a magnetic core, an adequate length of wire must be provided as indicated schematically, for example, at 57, 58, and 59 in FIG. 5. If no means are provided for increasing and holding the length of the segments 57–59, they may be pulled taut by the flyer (as shown for example by dashed lines 61, 62, 63 in FIG. 5) when the coil receiver 14 is indexed and when flyer rotation commences for the next coil group. Taut interpole wires result, at best, in tight winding turns during a subsequent coil insertion process; and at the worst, in broken wires during a subsequent insertion process. One form of the present invention includes making provision for slack interpole winding segments, as shown at 57, 58, 59.

Methods embodying the present invention in a preferred form include grasping a segment of wire after a first coil group has been developed, and moving the grasped segment of wire in generally the same direction as the direction of index of the initially developed coil group so that a slack interpole lead of suitable length is maintained between the grasped wire segment and the first coil group. The grasped segment of wire continues to be grasped until a number of turns for an initial coil of a subsequent coil group have been generated. During the time that the grasped segment of wire is advanced in the general direction of coil receiver index, an extra segment of wire is pulled from the wire supply to insure the presence of an adequate amount of wire in each interpole segment.

One means by which the just described method may be carried out is, as noted previously, illustrated in FIG. 4. Attention is now directed to FIG. 4 and FIG. 1 for an understanding of the mode of operation of the apparatus of FIG. 4. In FIG. 1, a portion 66 of a wire clamp has been shown in phantom and in three different positions. Initially, the clamp portion 66 (of the lead puller assembly 67 of FIG. 4) is disposed below the winding plane 23 at the position indicated at 68. However, as the flyer 11 decelerates prior to completion of a coil group, the portion 66 is raised in a forward mode to an elevated position (as shown at 69) just outside of the winding plane 13. Then, during the last revolution of the flyer 11, portion 66 is pivoted, in a forward mode, from the position indicated at 69 into and across the winding plane so that a final segment of wire will be pulled thereacross.

With reference again now to FIG. 4, it will be understood that when a final coil segment 71 is positioned relative to the open clamp portion 66 as shown in FIG. 4, the flyer will have stopped rotating. Thereafter, the clamp portion 66 moves in a first or forward mode and closes against clamp portion 72 under the action of cylinder 73, is rotated or pivoted in a second (or reverse with respect to the forward direction) mode out of the winding plane by rotary air motor or cylinder 74, and is moved in a first or forward mode along the winding plane a first increment to a new position (due to cylinder 81 retracting) as the coil receiver is indexed a predetermined amount in the direction of arrow 77. The lead puller assembly swings about pivot post 77 in the direction of arrow 78 so as to move the clamp in a forward mode along the winding plane. Although the wire clamp is moved out of interfering relationship with the winding plane, it continues to be positioned closely adjacent to the winding plane so that when the flyer starts generating turns for the next coil, there will be no danger of a wire segment being wrapped diagonally up from the wire clamp and around the free ends of the coil receiver pins.

After a number of turns (for example five to 10 turns) of a subsequent coil group have been wound by the flyer, the wire clamp is released by actuating air cylinder 73 to cause a reverse mode movement thereof, the wire clamp undergoes reverse mode movement by being dropped away from the winding plane (by cylinder 79), and then returned to an initial position by cylinder 81 until the flyer again nears completion of a coil group. Then, when the flyer again nears such completion, the lead puller assembly sequence is initiated by actuation of cylinder 73 to open the clamp. Thereafter, the assembly 67 is cycled as previously described. It should be understood that "forward" and "reverse" modes, as referred to herein, indicate back and forth movements by the appropriate structural component, and either extension or retraction of a drive motor may be arbitrarily designated as a forward mode movement.

In FIG. 5, portions of the interpole wire segments 57, 58, 59, that were clamped with interpole wire puller means embodying the invention are clearly revealed at 105, 110, and 115. It should now be understood that the portions 105, 110, 115 result when slack interpole wire segments are established and maintained, in accordance with my invention, between first and second (and usually physically adjacent) poles or groups of coils that are positioned in a winding turn receiver.

The sequence of the various forward and reverse mode motions of wire clamp part 71' (of FIG. 6), relative to sequences in a winding cycle will now be described. As the last few turns of a pole (or coil group) are developed by flyer 83 about coil form assembly 84, the wire clamp 71' is raised to an elevated position closely adjacent to the winding plane for the flyer 83. Then, during the final revolution of the flyer 83, the clamp 71' is tilted into the winding plane by motor 74', so that a final wire segment 86 is pulled thereacross. Clamp part 71' then closes on the wire segment, and swings back to its position closely adjacent to the winding plane under control of air motor 74', and the parts of FIG. 6 have been shown at this particular point in an operational cycle. By this time, the flyer 83 will have come to rest.

The coil form assembly then raises to an initial position (relative to receiver 87) and the winding receiver 87 indexes. The wire clamp parts 71', 72' swing the clasped wire segment in the direction of arrow 78' to a different position to maintain a slack condition between the clamped segment 86 and the just generated coil group. Thus, a slack interpole condition is maintained. The clamp parts 71', 72' remain closely adjacent to the winding plane for the same reason as clamp parts 71, 72 in the assembly of FIG. 4. After the flyer 83 has generated turns for a subsequent coil group, the clamp parts 71', 72' release the wire segment 86, close, and return to a lower position in preparation for the next lead pulling sequence.

Figure 6:
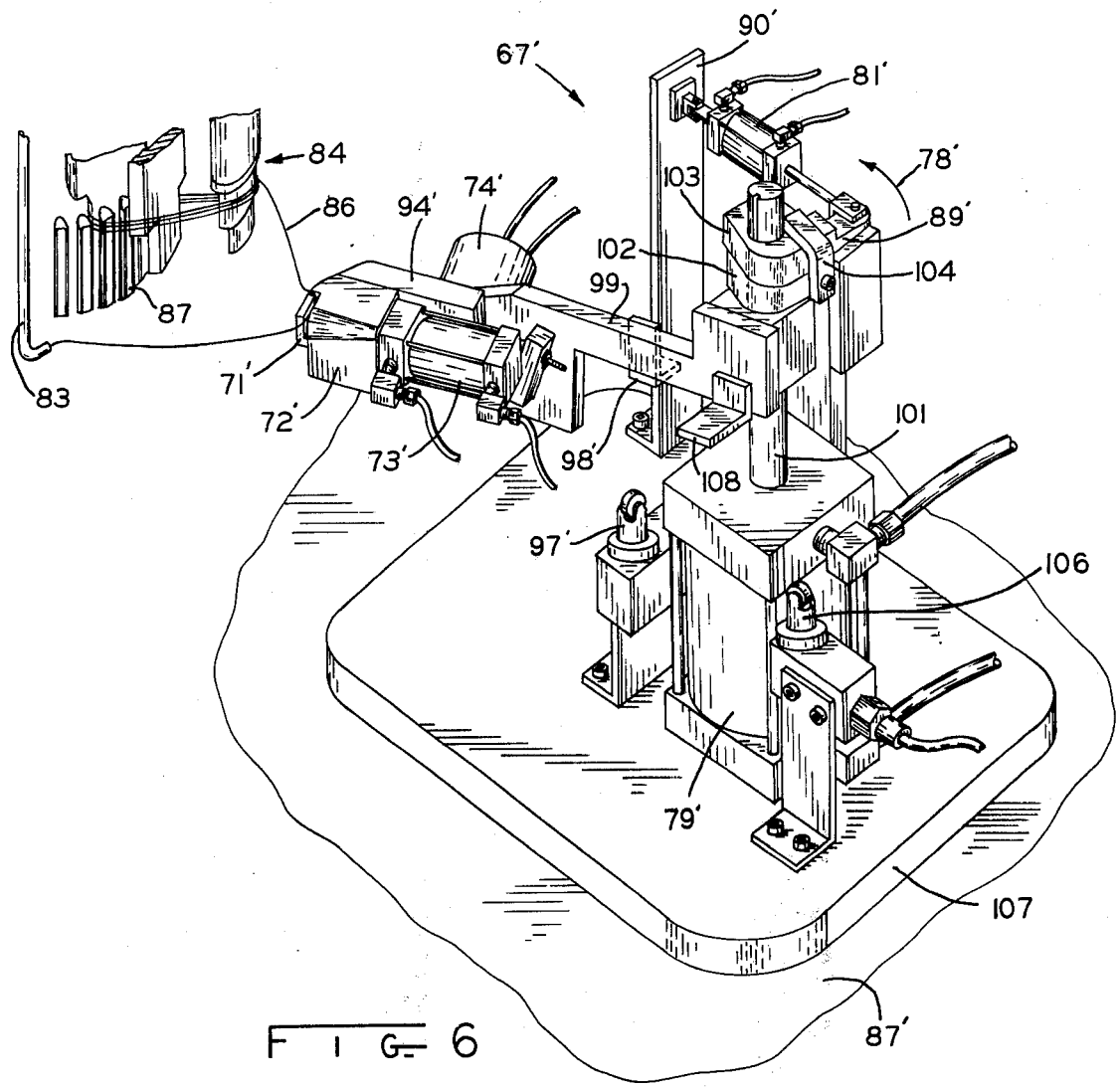
FIG. 6 illustrates a modified form of device that may be utilized in lieu of the device shown in FIG. 5.

Although the main construction features and operational relationships of the FIG. 4 and FIG. 6 assemblies will now be understood, additional details are now presented, with initial reference to the assembly of FIG. 4. The support or pivot post 71 is mounted to a winding machine frame plate 87. A bushing 88 disposed on the post 71 is free to move in a rotational mode about the post by the action of the air cylinder 81 which is interconnected between a crank arm 89 (welded to the bushing) and an assembly frame portion 90. Also welded to the bushing is a yoke 91 which carries a pivot pin 92. Supported on the pivot pin 92 is a swing arm 93, the position of which relative to the yoke 92 is controlled by the air cylinder 79 (which is also carried by yoke 91). At the end of the swing arm 93, a mounting block 94 is supported and rotatable by the rotary air motor 74. The mounting block 94, on the other hand, supports air cylinder 73 and the stationary clamp surface 72. The piston of air cylinder 73 is connected to a movable clamp jaw 66 which slides relative to the mounting block 94.

Also included, as part of the assembly 67, are limit switch 97 and flag 98 which cooperate to provide a signal when swing arm 93 is in its lower position. Similarly, limit switch 120 serves as a positive stop for yoke 91, and also signals when yoke 91 is in its "home" position.

It will be understood that the air cylinders and rotary motors just described may be of the spring return type to provide a fail-safe type of mechanism. Thus, they would be selected so that the various parts of assembly 67 would be moved to a "rest" or "home" position by spring action in the event of a power interruption.

It will be understood that the assembly 67' of FIG. 6 may be utilized in lieu of the assembly 67 of FIG. 4. Air cylinders (or motors) of assembly 67' which operate in the same sequence as the air cylinders, (or motors) of FIG. 4 (and for the same purpose) have been denoted with primed reference numerals that otherwise correspond to the reference numerals used in FIG. 4. Also, other parts of assembly 67' that correspond to parts of assembly 67 have also been denoted with corresponding primed reference numerals. It will be noted that the primary difference between the assemblies 67 and 67' is that an arm 99 in FIG. 6 is locked to piston rod 101 of cylinder 79' and reciprocates with rod 101 rather than swinging in the fashion of swing arm 93 in FIG. 4. Moreover, rod 101 is keyed to rotate with, but free to slide relative to, crank block 103. Although it is not readily apparent in FIG. 6, a block 102 is supported by the assembly frame and serves to stabilize rod 101 and support the weight of crank block 103. Moreover, block 102 carries a stop 104 which limits rotational movement of crank arm 89' (and thus rod 101 and arm 99 fastened thereto).

A limit switch 106, mounted on base 107, is engaged by flag 108 when swing arm 99 has moved a clamped interpole wire segment to desired position. Air lines for each of the air motors or cylinders in FIGS. 6 and 4 have been shown, but not described in detail, it being understood that each air line is connected to a different solenoid operated air valve whose operation is controlled by the same control panel or module that is used to control the operation of a complete winding machine cycle.

It will be recalled that reference was made hereinabove to a device which has been used commercially by the assignee of the present invention. It is now noted that the structure shown e.g., in FIG. 6, differs from such old structure in a number of ways. For example, the "old" structure was not provided with mechanisms that permitted positioning of a clamp sequentially at a position remote from a winding plane, adjacent to the winding plane, and then across or in such winding plane. In addition, the "old" structure could reciprocate only along a straight line, and was not movable in an arc about an axis parallel to the axis of a coil receiver or holder.

On the other hand, in the embodiments of FIGS. 4 and 6, first power means (cylinders 79 or 79') have a first end positioned in a fixed horizontal plane and move a clamp supporting member (arms 93 or 99) to different predetermined elevated positions. These members, in turn, support other power means that move a clamp assembly to still another different predetermined position; and, moreover, these members are movable in response to still other power means (cylinders 81, 81'), so as to be movable to different positions relative to a coil receiver and machine frame.

Although the invention has now been described with extensive reference, for purposes of illustration, to preferred methods and devices which may be utilized to carry out the invention, changes may be made therein without departing from the spirit of the invention. Therefore, while I have shown and described what at present are considered to be preferred and alternate embodiments of my invention in accordance with the Patent Statutes, changes may be made therein without actually departing from the true spirit and scope of the invention. Accordingly, I intend to cover in the following claims all such equivalent variations as fall within the invention.

What I claim as new and desire to secure by Letters Patent of the United States is:

1. A method of developing at least first and second wound coils, and establishing and maintaining a slack intercoil wire segment that extends between and interconnects first and second spaced apart coils in a winding receiver, said method comprising: initiating operation of a winding mechanism assembly that includes at least one magnet wire dispensing means, at least one winding turn size determining means, at least one winding turn receiver that is movable about a longitudinal axis, and at least one wire clamp; relatively moving the at least one winding turn size determining means and the at least one magnet wire dispensing means and generating a plurality of winding turns for the first coil while retaining the at least one wire clamp in a first position remote from the at least one wire dispensing means; moving the at least one clamp to a second position adjacent to a winding plane while generating a final turn of the first coil, then moving at least a portion of the at least one clamp to an intercept position for intercepting a final wire segment of the first coil, and intercepting a final wire segment of the first coil with the at least a portion of the at least one clamp; clamping the intercepted final wire segment with the at least a portion of the at least one clamp; moving the at least a portion of the at least one clamp and the clamped wire segment from the intercept position to a final hold position adjacent the winding plane substantially concurrently with movement of the at least one winding turn receiver about the longitudinal axis while the first coil is retained therein; generating turns of wire for a second coil by relatively moving the at least one winding turn size determining means and the at least one wire dispensing means while continuing to hold the clamped wire segment in the final hold position; releasing the clamped wire segment; and returning the at least one clamp to the first position remote from the at least one wire dispensing means; the substantially concurrent movement of the at least one winding turn receiver and clamped wire segment maintaining a slack intercoil wire segment between the first coil and the at least one wire clamp.

2. The method of claim 1 further including pulling a length of wire from the dispensing means while moving the clamped wire segment to the final hold position.

3. A method of developing at least first and second wound coils, and establishing and maintaining a slack intercoil wire segment that extends between and interconnects first and second spaced apart coils in a coil holder that is movable at least about a first longitudinal axis, said method comprising: initiating operation of a winding machine that includes at least one wire dispenser, at least one coil form, at least one coil holder, and at least one wire clamp that is movable in a direction toward and away from a winding plane as well as along an arcuate path about a clamp axis that extends generally in the same direction as the first longitudinal axis; relatively rotating the at least one wire dispenser and at least one coil form so that a continuous strand of wire extending therebetween is generated into a number of wire turns for a first coil; intercepting and clamping a final portion of a final wire segment of the first coil as the final turn thereof is completed; moving the coil holder, with the first coil held therein, about the first longitudinal axis, and swinging the at least one clamp and clamped portion of the final wire segment about the clamp axis generally in the same direction as the direction of movement of the first coil; holding the coil holder, at least one clamp, and clamped portion of the final wire segment stationary relative to one another; relatively rotating the at least one wire dispenser and at least one coil form so as to generate a plurality of turns of a second coil; releasing the clamped final wire segment; and swinging the at least one clamp about the clamp axis and away from the released final wire segment.

4. The method of claim 3 wherein intercepting and clamping includes: moving the at least one wire clamp from a rest position remote from a winding plane to a ready position adjacent to the winding plane; separating two jaw parts of the clamp; moving at least one of the jaw parts in an arcuate path and into the winding plane; intercepting the final portion of the final wire segment with the at least one of the jaw parts; relatively moving the jaw parts and clamping the final wire segment therebetween; and again moving the at least one of the jaw parts in an arcuate path out of the winding plane to a position adjacent to the winding plane.

5. The method of claim 4 wherein the wire dispenser is a flyer rotatable about the coil form for generating a plurality of turns in a winding plane, the method further comprising damping movement of the wire segments being dispensed about the coil form.

6. Improved coil winding apparatus comprising a winding machine frame, a wire dispenser, means for determining the size of winding turns, a winding turn receiver, and interpole wire puller means for intercepting and clamping each final wire segment that interconnects adjacent coil groups which are ultimately received in the winding turn receiver; said interpole wire puller means comprising a first power means; a clamp supporting member movable in response to the first power means to different predetermined positions relative to the machine frame; a clamp assembly, including first and second clamp members, carried by the clamp supporting member and movable to different predetermined positions relative to the clamp supporting member; second power means for moving the clamp assembly to different predetermined positions relative to the clamp supporting member; third power means for moving the first clamp part relative to the second clamp part; and fourth power means operatively connected with the clamp supporting member for moving the clamp supporting member to other predetermined positions.

7. The structure of claim 6 wherein the winding turn receiver is rotatable about a longitudinal axis, and the fourth power means is operable to move the clamp supporting member in an arc about an axis that is generally parallel to the longitudinal axis.

8. The structure of claim 6 wherein the second power means is operative to move at least part of the clamp assembly to a position for intercepting a wire segment extending between the wire dispenser and the means for determining the size of winding turns.

9. The structure of claim 6 wherein the first power means comprises an air cylinder having a first end fixed in a first plane and a rod associated therewith interconnected with the clamp supporting member for moving at least part of the clamp supporting member to different positions relative to the first plane.

10. The structure of claim 9 wherein the clamp supporting member is pivotally supported and said at least part of the clamp is movable in an arcuate path in response to said air cylinder.

11. The structure of claim 9 wherein the clamp supporting member is non-pivotally interconnected to the rod and constrained to reciprocate therewith.

12. The structure of claim 9 wherein the third and fourth power means are air cylinders.

13. The structure of claim 9 wherein the second power means is a reversible rotary motor.

14. The structure of claim 13 wherein the rotary motor is an air motor.

15. Winding apparatus comprising a frame, at least one coil receiver, at least one coil form, at least one wire dispenser, means for damping oscillations of wire being dispensed about the at least one coil form, and interpole wire clamp means for maintaining a slack intercoil wire segment between two coils comprised of wire turns generated about the at least one coil form and received in the coil receiver.

16. The apparatus of claim 15 further comprising a contorted guide path for wire dispensed by the wire dispenser, and means for propelling an end of wire along the contorted guide path.

17. A method of developing at least first and second wound coils, and establishing and maintaining a slack intercoil wire segment that extends between and interconnects first and second spaced apart coils in a winding receiver, said method comprising: initiating operation of a winding mechanism assembly that includes at least one magnet wire dispensing means, at least one winding turn size determining means, at least one winding turn receiver, and at least one wire clamp; relatively moving the at least one winding turn size determining means and the at least one magnet wire dispensing means and generating a plurality of winding turns for the first coil; moving at least a portion of the at least one wire clamp to an intercept position for intercepting a wire segment of the first coil, intercepting a wire segment of wire of the first coil with the at least a portion of the at least one clamp, and clamping a portion of the intercepted wire segment with the at least a portion of the at least one clamp, moving the plurality of winding turns for the first coil in a predetermined direction and, substantially concurrently therewith, moving the at least a portion of the at least one clamp and the clamped portion of the intercepted wire segment generally in the same predetermined direction; and generating turns of wire for a second coil by relatively moving the at least one winding turn size determining means and the at least one wire dispensing means; the substantially concurrent movement of the at least one winding turn receiver and clamped portion of the intercepted wire segment preventing the wire segment between the plurality of winding turns and the at least one wire clamp from being pulled taut.

18. In a method of developing at least first and second wound coils and preventing an intercoil wire segment that extends between and interconnects first and second spaced apart coils from being pulled taut, wherein at least one winding turn size determining means and at least one magnet wire dispensing means are relatively moved to generate a plurality of winding turns for a first coil at a first position, the first coil is moved in a predetermined direction to a second position, and a plurality of winding turns are generated for a second coil that is interconnected with the first coil by the intercoil wire segment; the improvement comprising: intercepting and grasping a portion of the intercoil wire segment with at least a portion of at least one clamp member before the winding turns for the second coil are generated and moving the grasped portion of the intercoil wire segment at least generally in the same given predetermined direction, by moving the at least one clamp member generally along at least two different planes.

19. The method of claim 18 wherein the at least two different planes are substantially mutually perpendicular.

20. Improved coil winding apparatus comprising a winding machine frame, a wire dispenser, means for determining the size of winding turns, a winding turn receiver, and intercoil wire segment clamping means for intercepting and holding wire segment that interconnects two spaced apart coils; said clamping means comprising a supporting member movable in at least two different planes; at least one clamp member movable with the supporting member; and means for moving said supporting member in the at least two different planes.

21. The apparatus of claim 20 wherein said means for moving includes a first power means interconnected with the supporting member for moving it generally along a first plane, and a second power means interconnected with the supporting member for moving it generally along a second plane other then the first plane.

22. The apparatus of claim 21 wherein the first and second planes are substantially mutually perpendicular to one another.

23. In a method of developing at least first and second wound coils and preventing an intercoil wire segment that extends between and interconnects first and second spaced apart coils from being pulled taut, wherein at least one winding turn size determining means and at least one magnet wire dispensing are relatively moved to generate a plurality of winding turns for a first coil at a first position, the first coil is moved in a predetermined direction to a second position, and a plurality of winding turns are generated for a second coil that is interconnected with the first coil by the intercoil wire segment; the improvement comprising: intercepting and grasping a portion of the intercoil wire segment with at least a portion of at least one clamp member before the winding turns for the second coil are generated and moving the grasped portion of the intercoil wire segment at least generally in the same given predetermined direction, by moving the at least one clamp member in a first direction and in a second direction that is not parallel with the first direction.

24. Improved coil winding apparatus comprising a winding machine frame, a wire dispenser, means for determining the size of winding turns, a winding turn receiver, and intercoil wire segment clamping means for intercepting and holding a wire segment that interconnects two spaced apart coils; said clamping means comprising a supporting member movable in both forward and reverse modes in at least two different nonparallel directions; at least one clamp member movable with the supporting member; and means for moving said supporting member in the forward and reverse modes in the at least two different directions.

25. The apparatus of claim 24 wherein said means for moving includes a first power means interconnected with the supporting member for moving it generally in the first direction, and a second power means interconnected with the supporting member for moving it generally in the second direction.

26. The apparatus of claim 25 wherein the first and second directions are generally mutually perpendicular to one another.

* * * * *